US011014022B2

(12) United States Patent
Gates et al.

(10) Patent No.: US 11,014,022 B2
(45) Date of Patent: May 25, 2021

(54) DIESEL DEHYDRATOR

(71) Applicant: Power Drives, Inc., Buffalo, NY (US)

(72) Inventors: Bradley R. Gates, Erie, PA (US); Kevin W. O'Neal, Erie, PA (US); Sean R. Jackson, Springboro, PA (US); Brandon Schwartz, Aledo, TX (US)

(73) Assignee: Power Drives, Inc., Buffalo, NY (US)

( * ) Notice: Subject to any disclaimer, the term of this patent is extended or adjusted under 35 U.S.C. 154(b) by 77 days.

(21) Appl. No.: 15/979,053

(22) Filed: May 14, 2018

(65) Prior Publication Data
US 2019/0344199 A1 Nov. 14, 2019

(51) Int. Cl.
*B01D 17/04* (2006.01)
*B01D 36/00* (2006.01)
*B01D 17/00* (2006.01)
*F02M 37/24* (2019.01)
*F02M 37/28* (2019.01)

(52) U.S. Cl.
CPC ........... *B01D 17/045* (2013.01); *B01D 17/10* (2013.01); *B01D 36/005* (2013.01); *B01D 36/006* (2013.01); *F02M 37/24* (2019.01); *F02M 37/28* (2019.01)

(58) Field of Classification Search
CPC ........ F02M 37/24; F02M 37/26; F02M 37/28; F02M 37/30; B01D 36/003; B01D 36/005; B01D 36/006; B01D 36/008; B01D 17/045; B01D 17/10; B01D 17/12
See application file for complete search history.

(56) References Cited

U.S. PATENT DOCUMENTS

| 4,476,028 A | 10/1984 | Harris |
| 4,637,351 A | 1/1987 | Pakula |
| 5,078,901 A * | 1/1992 | Sparrow ................. F02M 37/24 |
| | | 210/744 |
| 7,445,704 B2 * | 11/2008 | Jorgensen ............ B01D 17/045 |
| | | 210/86 |
| 9,724,628 B2 | 8/2017 | Morris et al. |
| 9,732,714 B2 | 8/2017 | Anderson et al. |

(Continued)

FOREIGN PATENT DOCUMENTS

| EP | 2347813 | 7/2011 | |
| JP | 58170847 A * | 10/1983 | ......... F02M 37/0047 |

(Continued)

OTHER PUBLICATIONS

English Translation of JP 58-170847 from EPO web site espacenet. com (Year: 1983).*

(Continued)

*Primary Examiner* — Terry K Cecil
(74) *Attorney, Agent, or Firm* — Simpson & Simpson, PLLC; Michael Nicholas Vranjes

(57) ABSTRACT

A fuel dehydrator, including a control panel, a fuel pump electrically connected to the control panel, the fuel pump including a first inlet fluidly connected to a fuel supply, and a first outlet, a fuel filter including a second inlet fluidly connected to the first outlet and a second outlet, a water separator, including a third inlet fluidly connected to the second outlet, a third outlet fluidly connected to a fuel return, and an automatic water drain valve fluidly connected to a water drain and electrically connected to the control panel.

19 Claims, 13 Drawing Sheets

(56) References Cited

U.S. PATENT DOCUMENTS

| | | | |
|---|---|---|---|
| 9,782,693 B2 | 10/2017 | Evanovich et al. | |
| 2006/0070956 A1* | 4/2006 | Herrmann | B01D 35/26 |
| | | | 210/744 |
| 2009/0090663 A1 | 4/2009 | Hirata et al. | |
| 2010/0219117 A1 | 9/2010 | Reiland et al. | |
| 2012/0080386 A1 | 4/2012 | Weindorf et al. | |
| 2015/0292453 A1* | 10/2015 | Rieke | F02M 37/0052 |
| | | | 123/485 |
| 2015/0343345 A1 | 12/2015 | Ryoo et al. | |
| 2016/0296862 A1 | 10/2016 | Libfeld et al. | |
| 2017/0050134 A1 | 2/2017 | Veit et al. | |
| 2017/0107957 A1 | 4/2017 | Abdalla | |
| 2017/0218896 A1 | 8/2017 | Weindorf et al. | |
| 2017/0298881 A1 | 10/2017 | Malgorn et al. | |
| 2017/0312669 A1 | 11/2017 | Sradnick | |
| 2017/0335812 A1 | 11/2017 | Xiao et al. | |
| 2018/0133631 A1* | 5/2018 | Willems | B01D 29/50 |

FOREIGN PATENT DOCUMENTS

| | | | | |
|---|---|---|---|---|
| WO | 2010/042663 | | 4/2010 | |
| WO | 2013/168648 | | 11/2013 | |
| WO | WO-2014154664 A1 * | 10/2014 | | F02M 37/24 |

OTHER PUBLICATIONS

English machine translation of WO2014154664 description from EPO website (Year: 2014).*

* cited by examiner

DIESEL DEHYDRATOR

FIELD

The present disclosure relates to fuel dehydrators, and, more particularly, to an assembly for filtering and dehydrating fuel and automatically controlled by a control panel.

BACKGROUND

A coalescer which operates by method of physical alteration or involvement of a droplet is influenced by mechanical, or physical, means. A more common type of coalescer, a mechanical coalescer, is applied in oil and gas industries worldwide for removal of water or hydrocarbon condensate. While coalescers by definition function as a separation tool for liquids, they are commonly used, and mistakenly referred to, as filters. In the oil and gas industry, coalescers are widely used to remove water and hydrocarbon liquids from fuel to ensure fuel quality and protect downstream equipment. Accumulated water in a fuel tank, for example a locomotive's fuel tank containing diesel fuel, causes inefficient engine performance and can lead to algae bloom. The water removed from the fuel must occasionally be drained. Failure to drain the water can cause a decrease in system efficiency, especially at or below freezing temperature.

Thus, there has been a long-felt need for a fuel filtering and dehydrating system that automatically drains water from the system.

SUMMARY

According to aspects illustrated herein, there is provided a fuel dehydrator, comprising a control panel, a fuel pump electrically connected to the control panel, the fuel pump including a first inlet fluidly connected to a fuel supply, and a first outlet, a fuel filter including a second inlet fluidly connected to the first outlet and a second outlet, a water separator, including a third inlet fluidly connected to the second outlet, a third outlet fluidly connected to a fuel return, and an automatic water drain valve fluidly connected to a water drain and electrically connected to the control panel.

According to aspects illustrated herein, there is provided a fuel dehydrator, comprising a control panel including at least one indicator light, a fuel pump electrically connected to the control panel, the fuel pump including a first inlet fluidly connected to a fuel supply, and a first outlet, a fuel filter including a second inlet fluidly connected to the first outlet and a second outlet, a water separator, including a third inlet fluidly connected to the second outlet, a third outlet fluidly connected to a fuel return, a water reservoir having a heating element, the heating element electrically connected to the control panel, and an automatic water drain valve fluidly connected to the water reservoir and a water drain, and electrically connected to the control panel.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims.

The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1A:
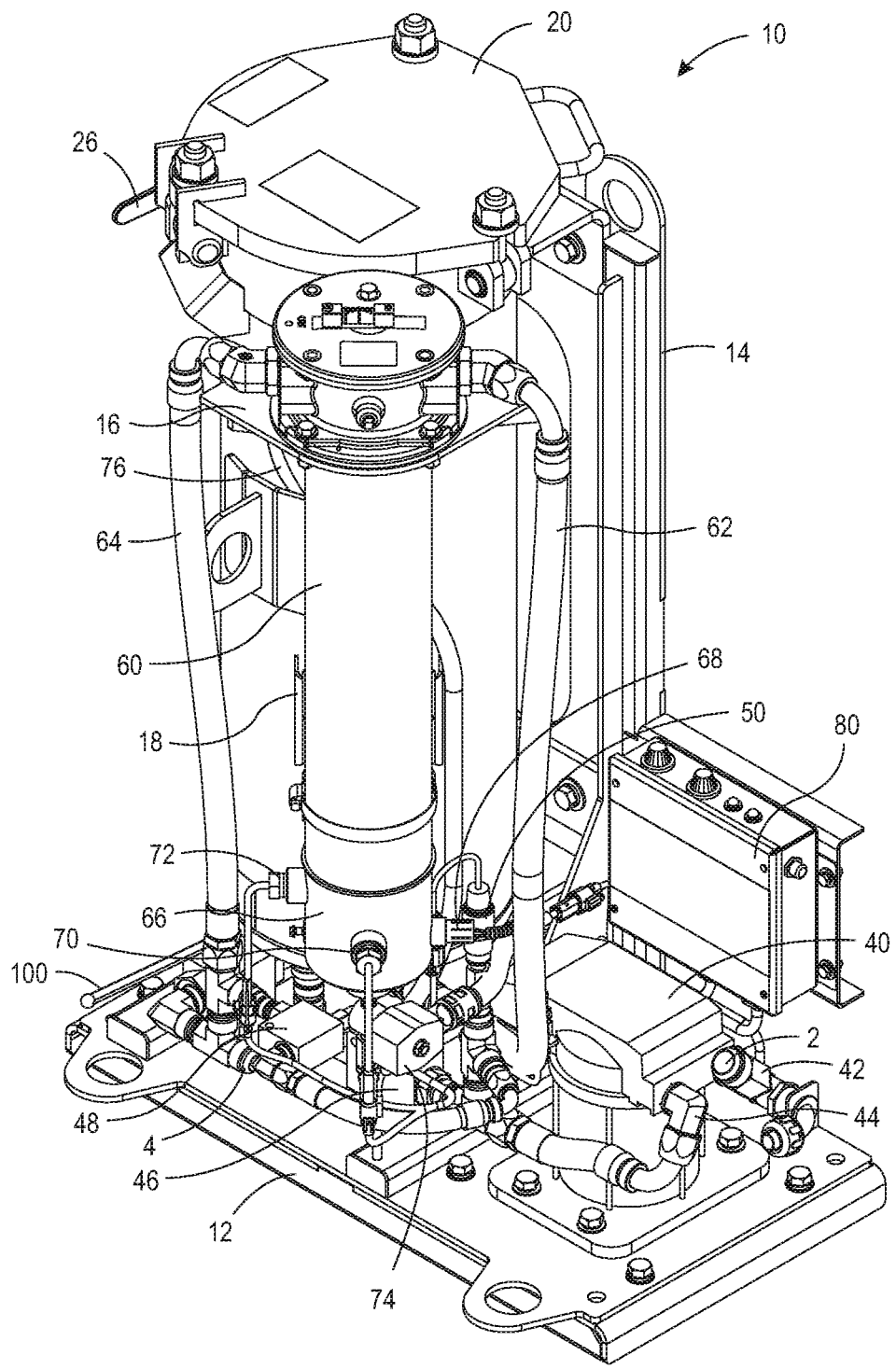
FIG. 1A is a front perspective view of a fuel dehydrator.
Figure 1B:
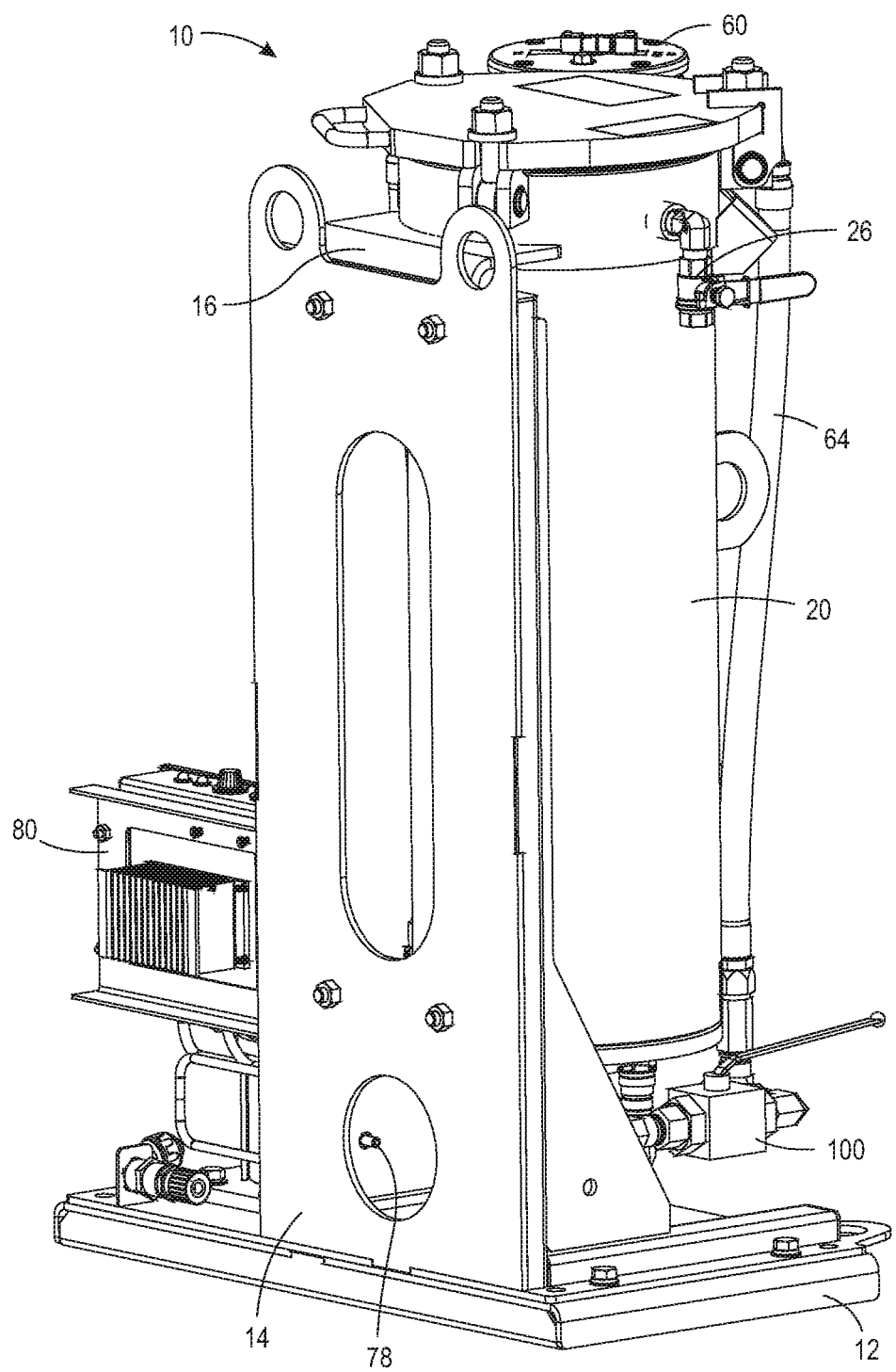
FIG. 1B is a rear perspective view of the fuel dehydrator shown in FIG. 1.
Figure 2A:
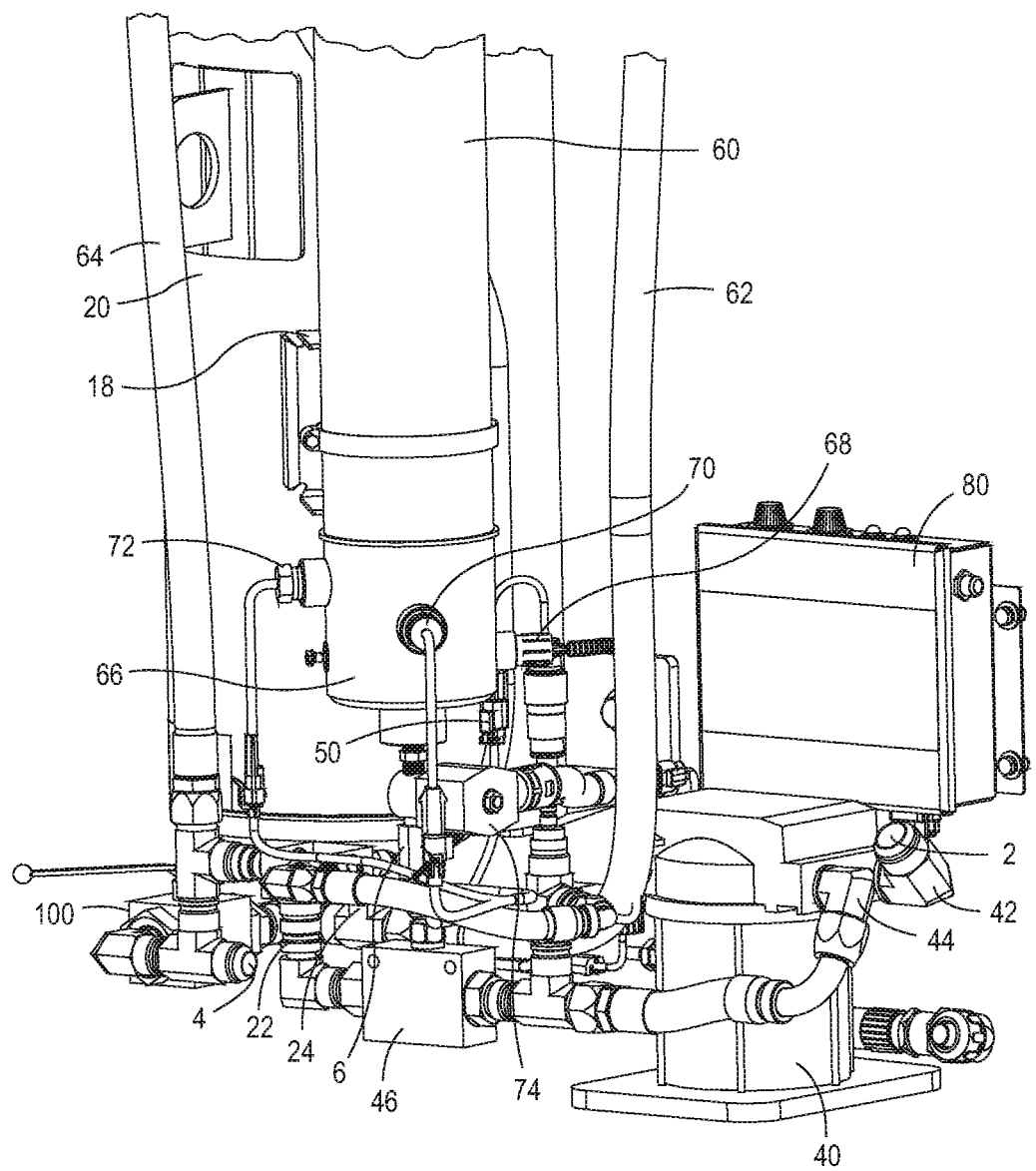
FIG. 2A is a partial front perspective view of the fuel dehydrator shown in FIG. 1.
Figure 2B:
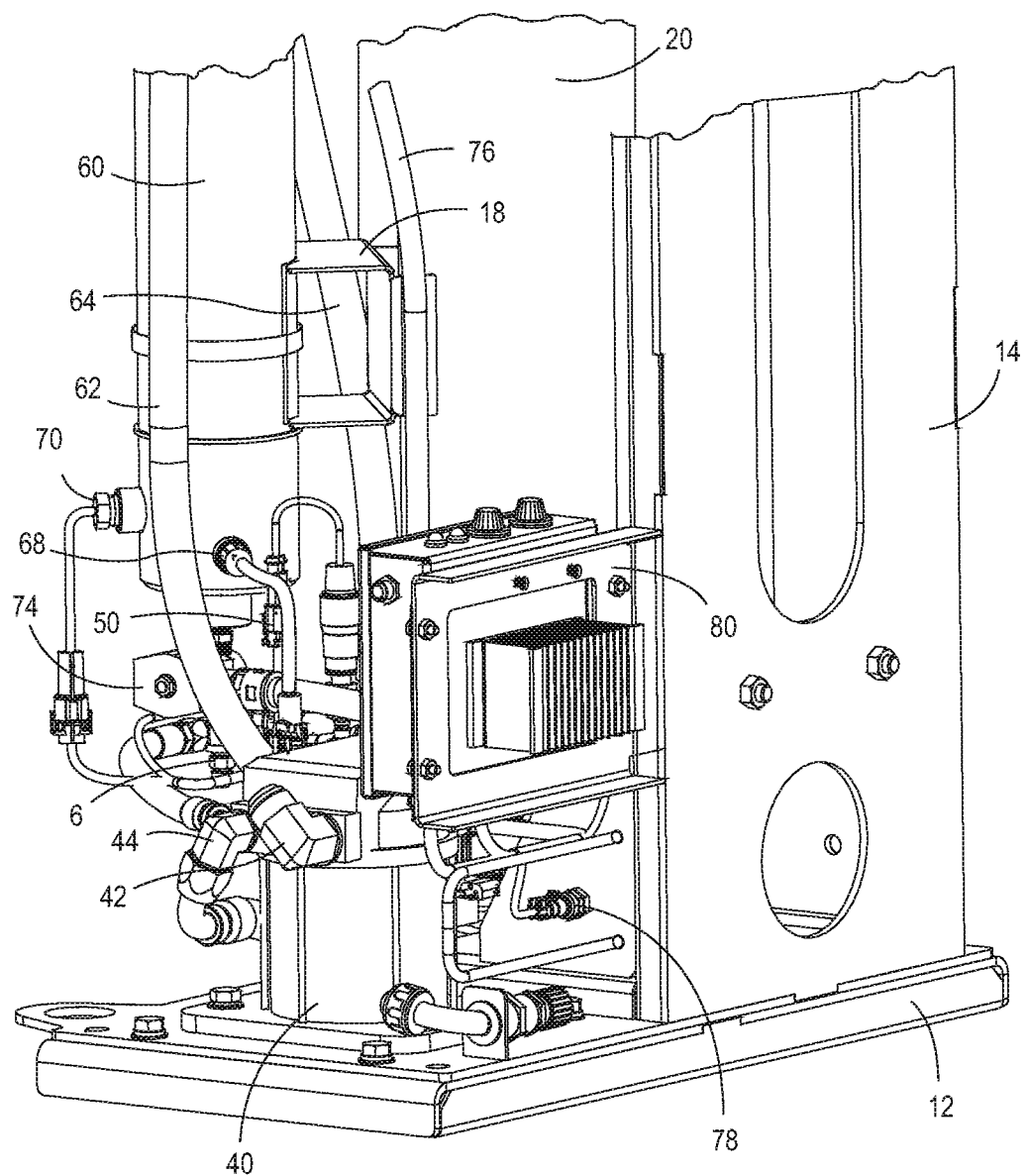
FIG. 2B is a partial rear perspective view of the fuel dehydrator shown in FIG. 1.
Figure 3:
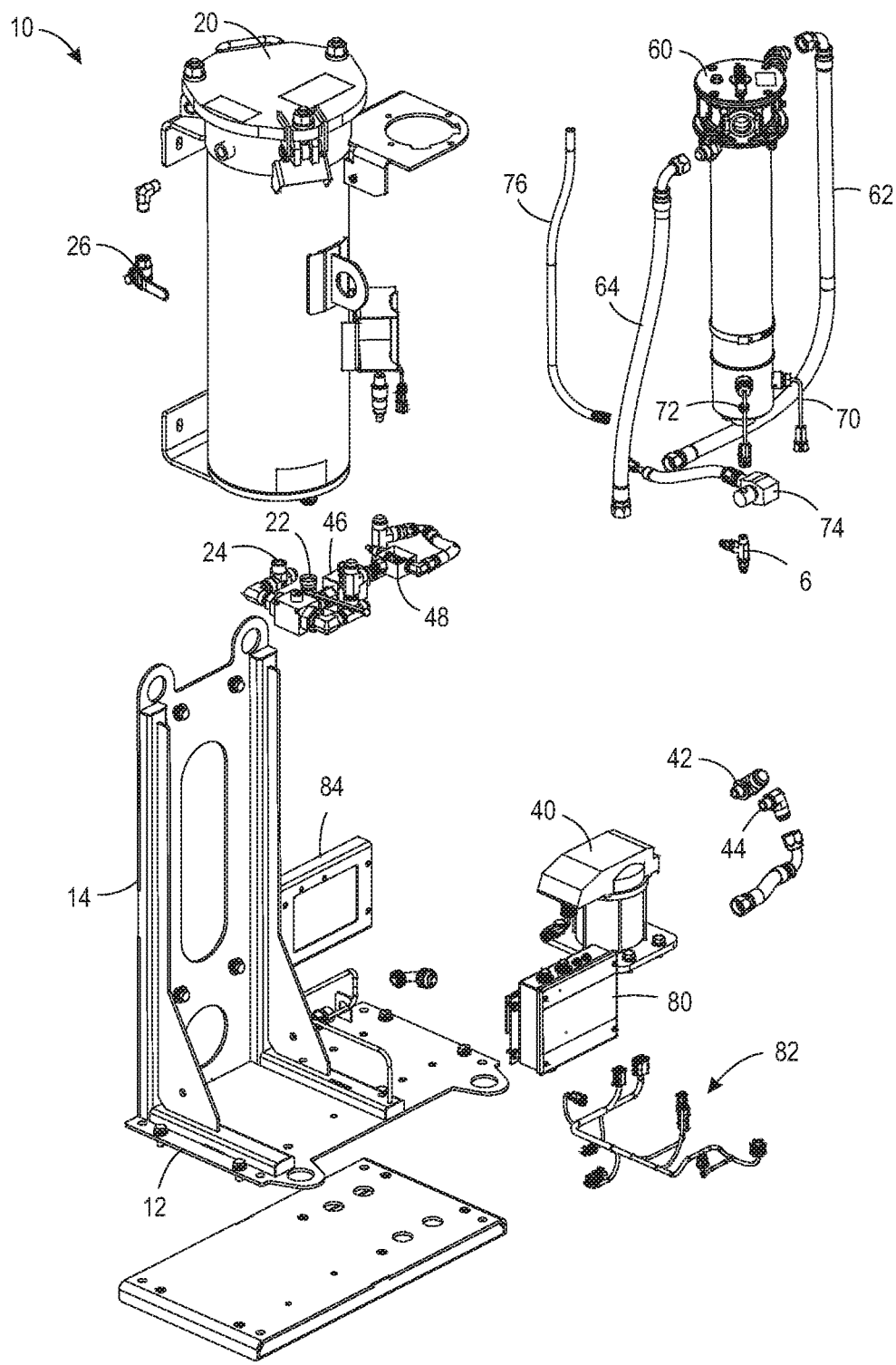
FIG. 3 is an exploded perspective view of the fuel dehydrator shown in FIG. 1.
Figure 4A:
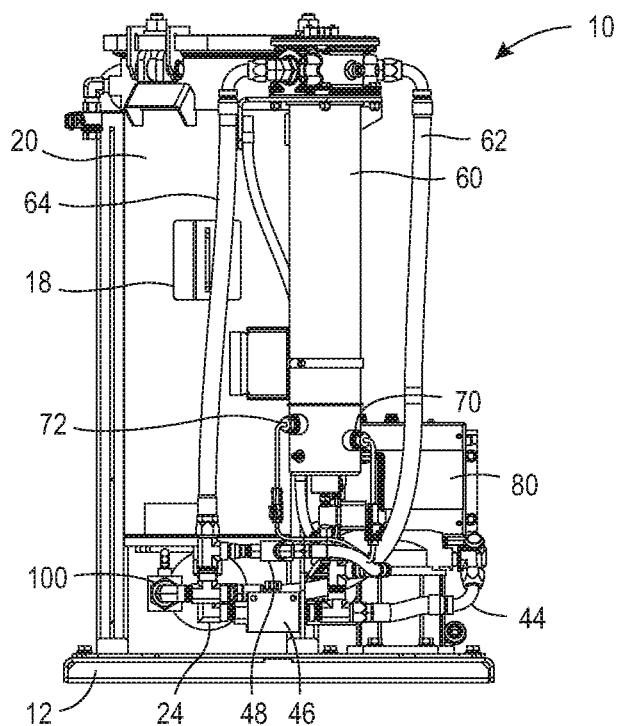
FIG. 4A is a front elevational view of the fuel dehydrator shown in FIG. 1.
Figure 4B:
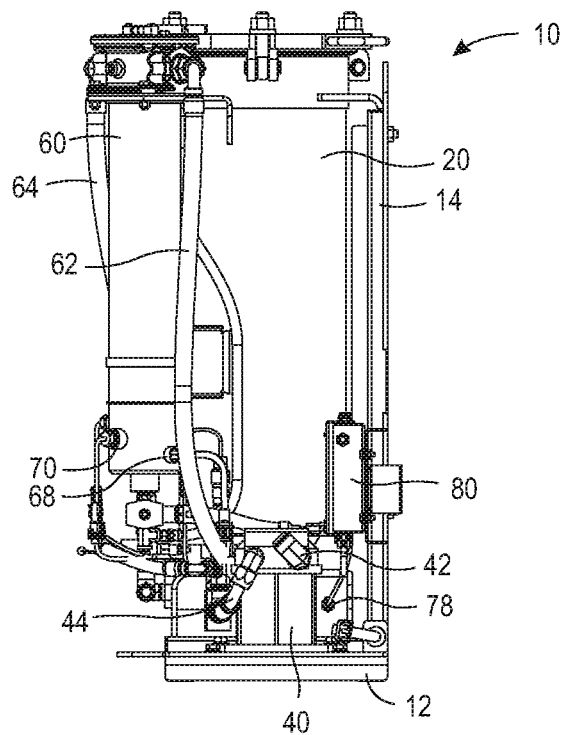
FIG. 4B is a side elevational view of the fuel dehydrator shown in FIG. 1.
Figure 4C:
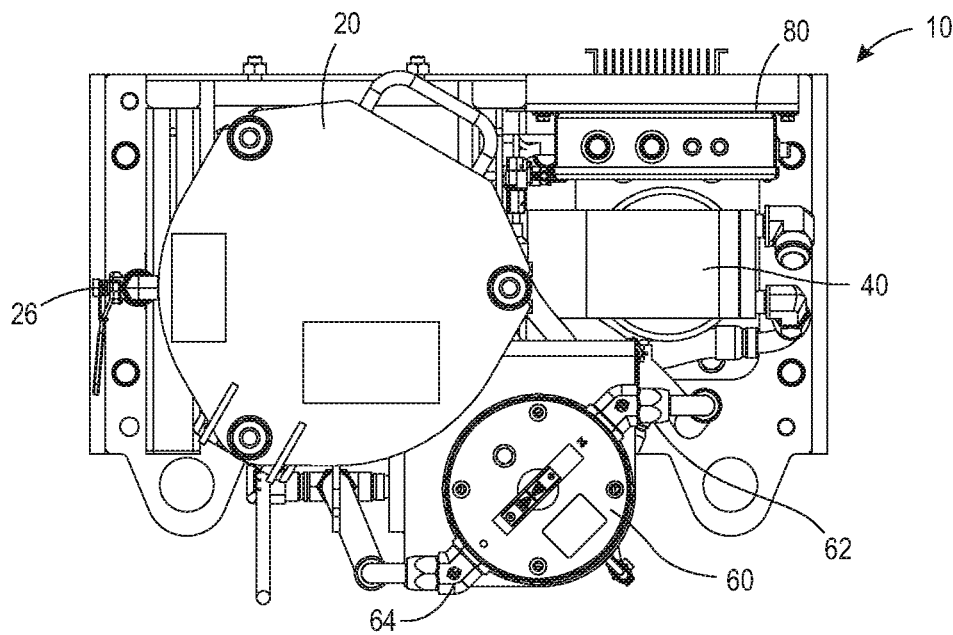
FIG. 4C is a top elevational view of the fuel dehydrator shown in FIG. 1.
Figure 4D:
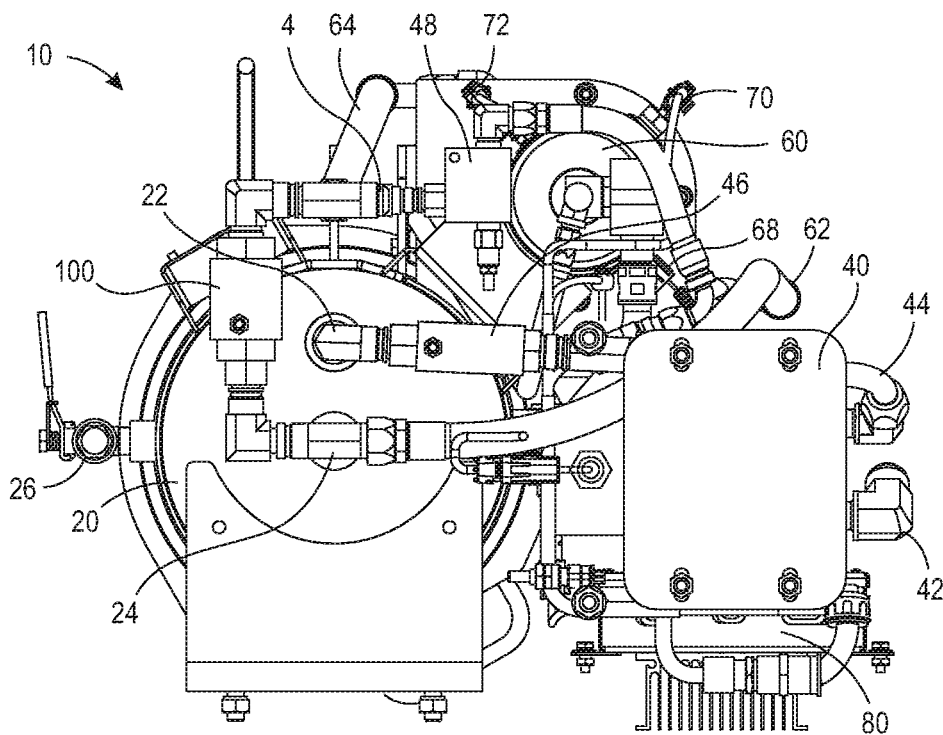
FIG. 4D is a bottom elevational view of the fuel dehydrator shown in FIG. 1.
Figure 5:
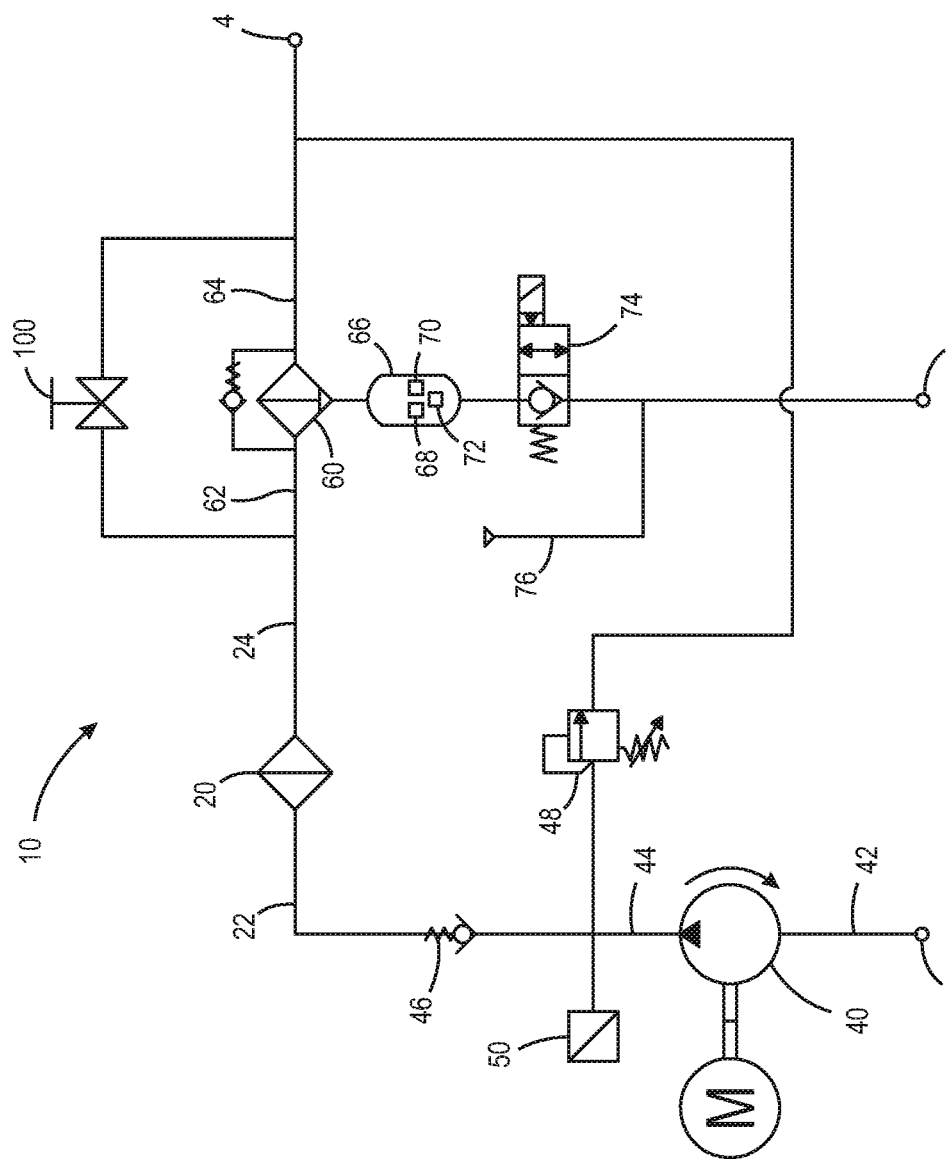
FIG. 5 is a schematic view of the fuel dehydrator shown in FIG. 1.

Adverting now to the figures, FIG. 1A is a front perspective view of fuel dehydrator 10. FIG. 1B is a rear perspective view of fuel dehydrator 10. FIG. 2A is a partial front perspective view of fuel dehydrator 10. FIG. 2B is a partial rear perspective view of fuel dehydrator 10. FIG. 3 is an exploded perspective view of fuel dehydrator shown 10. FIG. 4A is a front elevational view of fuel dehydrator 10. FIG. 4B is a side elevational view of fuel dehydrator 10. FIG. 4C is a top elevational view of the fuel dehydrator 10. FIG. 4D is a bottom elevational view of fuel dehydrator 10. It should be appreciated that in FIG. 4D, base 12 has been removed to better view fuel dehydrator 10. FIG. 5 is a schematic view of fuel dehydrator 10. Fuel dehydrator 10 generally comprises fuel filter 20, fuel pump 40, water separator 60, and control panel 80. Fuel dehydrator 10 is intended to be installed in a diesel locomotive, specifically within the engine or radiator cab. However, it should be appreciated that fuel dehydrator 10 may be used for other applications, for example in marine applications, tractor trailers, or other heavy equipment, and should not be limited to use in locomotives. The following description should be read in view of FIGS. 1A-5.

Fuel pump 40 comprises inlet 42 and outlet 44. Fuel pump 40 is any pump that carries fuel from the fuel tank to fuel filter 20. Inlet 42 is arranged to be connected to fuel supply 2. Outlet 44 is fluidly connected to backpressure check valve 46 via a hose or pipe. Backpressure check valve 46 is any check valve, also known as a non-return or one-way valve, arranged to allow fluid to flow one way in the hose or pipe. Fuel pump 40 is connected to base 12 via any suitable means, for example, bolts, screws, rivets, welding, adhesives, etc. Fuel pump 40 is electrically connected to control panel 80 via electrical conduit 82.

Fuel filter 20 comprises inlet 22 and outlet 24. Fuel enters fuel filter 20 via inlet 22, which is fluidly connected to backpressure check valve 46 via a hose or pipe. Fuel filter 20 is any fuel filter suitable for filtering fuel, specifically diesel fuel. In an example embodiment, fuel filter 20 comprises a particulate matter or media filter arranged to clean fuel down to impurities of five microns, or to ISO 11/8/6. Fuel flows through fuel filter 20, is cleaned therein, and exits via outlet 24. Fuel filter 20 is connected to base 12 via frame 14. In the embodiment shown, fuel filter 20 is secured to frame 14 via brackets and fasteners; however, it should be appreciated that fuel filter 20 may be secured to frame 14 using any suitable means, for example, bolts, screws, rivets, welding, adhesives, etc. From outlet 24, fuel is arranged to flow either through bypass valve 100 to fuel return 4 or to water separator 60. Fuel filter 20 further comprises vent valve 26, which allows pressure to be released prior to filter replacement (i.e., removing the lid to replace the media filter).

Water separator 60 comprises inlet 62 and outlet 64. Inlet 62 is fluidly connected to outlet 24 via a hose or pipe. If bypass valve 100 is closed, fuel flows from outlet 24 into water separator 60 via inlet 62. Water separator 60 is an in-line mechanical coalescing filter arranged to separate water from the fuel. Water separator 60 further comprises water reservoir 66 arranged near the bottom thereof. As fuel flows through water separator 60, filters or baffles force water droplets to coalesce down to water reservoir. In an example embodiment, water separator 60 is an electrostatic coalescer. Outlet 64 is fluidly connected to fuel return 4 via a hose or pipe. Water separator 60 is connected to fuel filter 20 via brackets 16 and 18.

Fuel dehydrator 10 further comprises relief valve 48 which is fluidly connected to outlet 64 via a hose or pipe. Relief valve 48 is fluidly connected to outlet 44 and outlet 64. Relief valve 48 is arranged to limit the maximum pressure of the system to prevent fuel pump 40 from being overloaded. In an example embodiment, relief valve 48 is a mechanical valve.

Fuel dehydrator 10 further comprises pressure switch 50. Pressure switch 50 is electrically connected to control panel 80 via electrical conduit 82. Pressure switch 50 is arranged to detect whether there is fuel pressure in fuel dehydrator 10. If there is no fuel pressure for a period of time, control panel 80 disables fuel dehydrator 10 to prevent damage thereto and the system enters an error state indicated by LEDs 126 and/or 128, as discussed in greater detail below.

Bypass valve 100 is arranged to allow fuel exiting fuel filter 20 to bypass water separator 60 and flow directly to fuel return 4. As previously mentioned, when bypass valve 100 is closed, fuel flows from outlet 24 of fuel filter 20 to inlet 62 of water separator 60. Specifically, the flow rate forces fuel up into water separator 60. However, when bypass valve 100 is open, fuel exiting fuel filter 20 is not forced up into water separator 60, but instead flows directly to fuel return 4. For example, it may be desired to open bypass valve 100 after shocking the fuel. Under normal operation, bypass valve 100 should be closed at all time.

Water reservoir 66 comprises automatic water drain valve 74. Automatic water drain valve 74 is electrically connected to control panel 80 via electrical conduit 82. Automatic water drain valve 74 is arranged to open when the water level in water reservoir 66 reaches a predetermined level, thereby draining the water therein to water drain 6. Automatic water drain valve 74 is in communication with water sensor 68, as will be discussed in greater detail below. Automatic water drain valve 74 is set to be closed, and upon receiving a signal to open, remains open for a predetermined period of time. For example, based on the volume of water needed to trigger an open signal, automatic water drain valve 74 may stay open for 3 seconds which is suitable to completely drain that volume of water. Automatic water drain valve 74 may be fluidly connected to water drain 6 via a hose or pipe. Additionally, fuel dehydrator 10 further comprises vent hose 76. At a first end, vent hose 76 is fluidly connected to automatic water drain valve 74, water drain 6, or the hose or pipe connecting automatic water drain valve 74 with water drain 6. At a second end, vent hose 76 may be connected to fuel filter 20 bracket 16, or water separator 60. Vent hose 76 allows water in the drain line to drain completely. Automatic water drain valve 74 may further comprise a light, for example a light emitting diode (LED) which visually indicates that it is open. In an example embodiment, a solenoid opens automatic water drain valve 74. However, it should be appreciated that automatic drain valve 74 may be any valve suitable for opening in response to receiving an electric signal. In an example embodiment, water reservoir 66 may further comprise a manual drain valve.

Water reservoir 66 comprises water in fuel (WIF) sensor 68. WIF sensor 68 is electrically connected to control panel 80 via electrical conduit 82. WIF sensor 68 is arranged to indicate the presence of water in fuel. Specifically, WIF sensor 68 is arranged in water reservoir 66 at a level such that, when the water level in the water separator reaches the level, WIF sensor 68 sends an electric signal to control panel 80. Control panel 80 then sends an electric signal to automatic drain valve 74 to open, thereby draining the water from water reservoir 66. As previously stated, automatic water drain valve 74 is arranged to, upon receiving an open signal, remain open for a predetermined period of time. The predetermined period of time is dependent on the level of WIF sensor 68 (i.e., the volume of water allowed to accumulate in water reservoir 66), such that upon opening all the water is drained from water reservoir 66.

Water reservoir 66 comprises heating element 70. Heating element 70 is electrically connected to control panel 80 via electrical conduit 82. Heating element 70 is arranged to prevent the water in water reservoir 66 from freezing. Specifically, heating element 70 is arranged to heat the water in water reservoir 66. Heating element 70 is in communication with temperature sensor 78, as will be discussed in greater detail below. Heating element is set to off, and upon receiving a signal to turn on, remains on until a signal is received to turn off. For example, if the temperature of the ambient air falls below 50 degrees Fahrenheit, temperature sensor 78 sends a signal to control panel 80. Control panel 80 then sends a signal to heating element 70 to turn on, thereby preventing the water in water reservoir 66 from freezing. Heating element 70 is also in communication with temperature switch 72, as will be discussed further below.

Fuel dehydrator 10 comprises temperature sensor 78. Temperature sensor 78 is electrically connected to control panel 80 via electrical conduit 82. Temperature sensor 78 is arranged to measure the temperature of the ambient air. Specifically, temperature sensor 78 is arranged to send an electric signal to control panel 80 when the temperature of the ambient air falls below a certain threshold. For example, when the temperature of the ambient air falls below 50 degrees Fahrenheit, temperature sensor 78 sends an electric signal to control panel 80. Control panel 80 then sends an electric signal to heating element 70 to turn on. When the temperature of the ambient air rises to 50 degrees Fahrenheit or above, temperature sensor 78 sends an electric signal to control panel 80. Control panel 80 then sends an electric signal to heating element 70 to turn off. In the embodiment shown, temperature sensor 78 is connected to frame 14. Temperature sensor 78 may be connected to frame 14 using any suitable means, such as bolts, screws, rivets, welding, adhesives, etc.

Water reservoir 66 comprises temperature switch 72. Temperature switch 72 is electrically connected to control panel 80 via electrical conduit 82. Temperature switch 72 is arranged to switch heating element 70 on or off. Generally, temperature switch 72 acts as a thermostat which senses the temperature of the water in water reservoir 66 which switches heating element 70 on or off. Specifically, temperature switch 72 is arranged to send an electric signal to control panel 80 when the temperature of the water in water reservoir 66 rises above a predetermined threshold. For example, when the temperature of the water in water reservoir 66 rises to 100 degrees Fahrenheit or above, temperature switch 72 sends an electric signal to control panel 80. Control panel 80 then sends an electric signal to heating element 70 to turn off When the temperature of the water in water reservoir 66 falls below 100 degrees Fahrenheit, temperature switch sends an electric signal to control panel 80. Control panel 80 then allows heating element 70 to turn on, dependent upon temperature sensor 78.

Figure 6A:
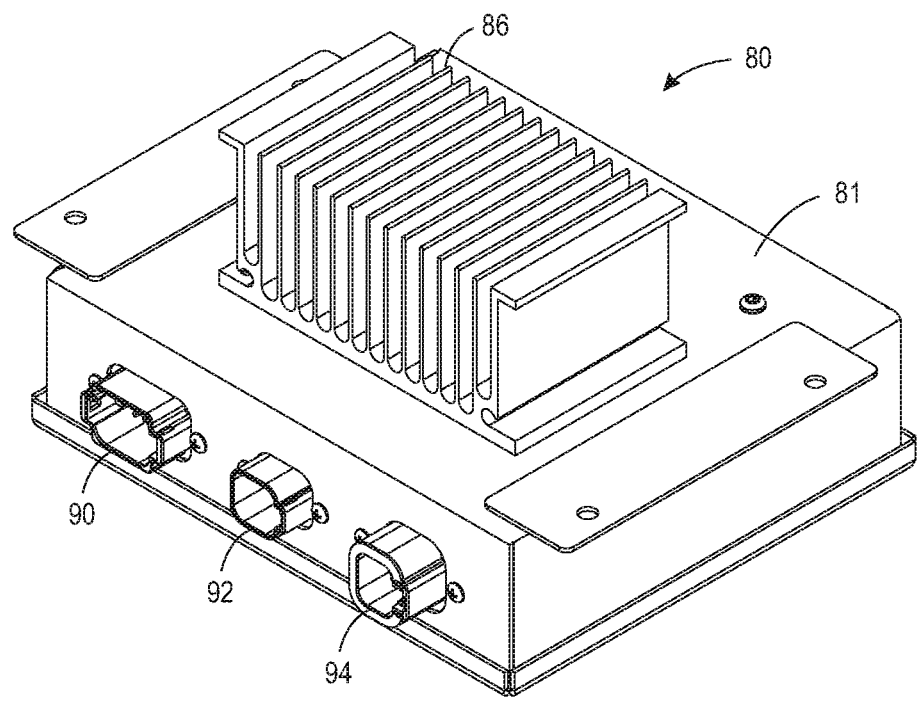
FIG. 6A is a rear perspective view of a control panel, as shown in FIG. 1.
Figure 6B:
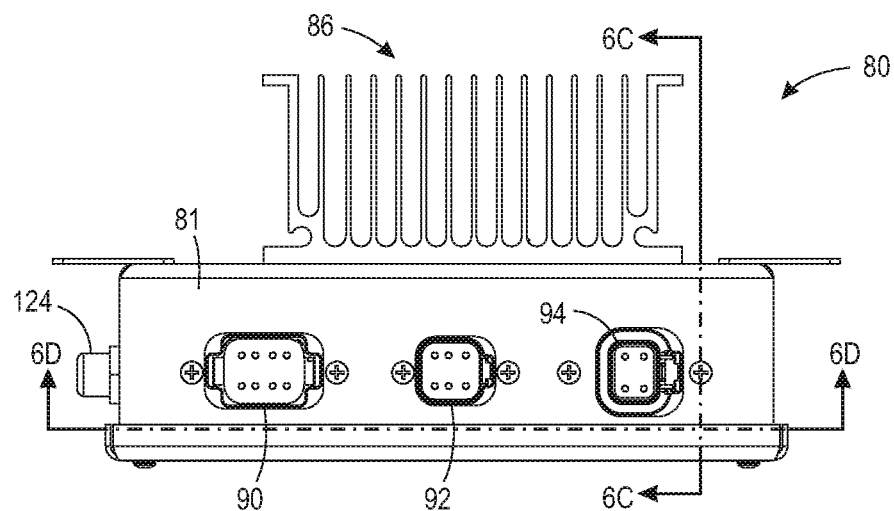
FIG. 6B is a bottom elevational view of the control panel shown in FIG. 6A.
Figure 6C:
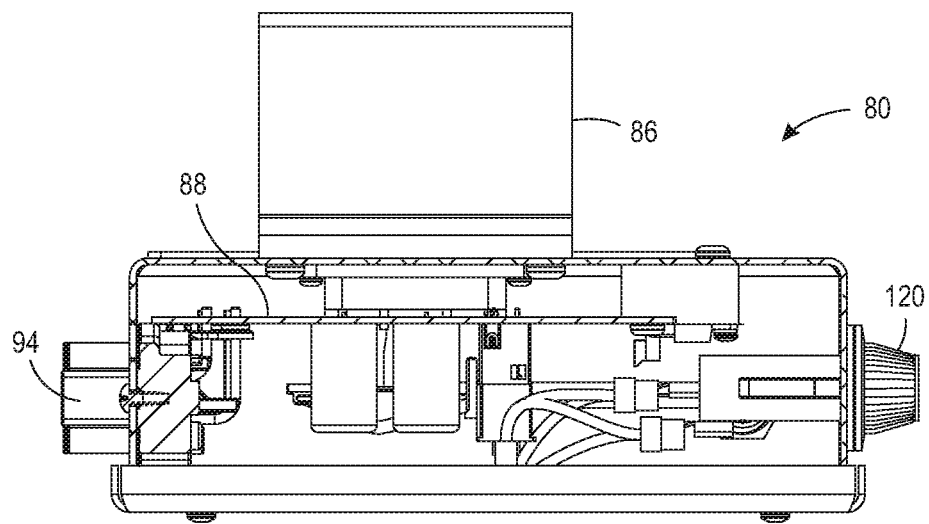
FIG. 6C is a cross-sectional view of the control panel taken generally along line 6C-6C in FIG. 6B.
Figure 6D:
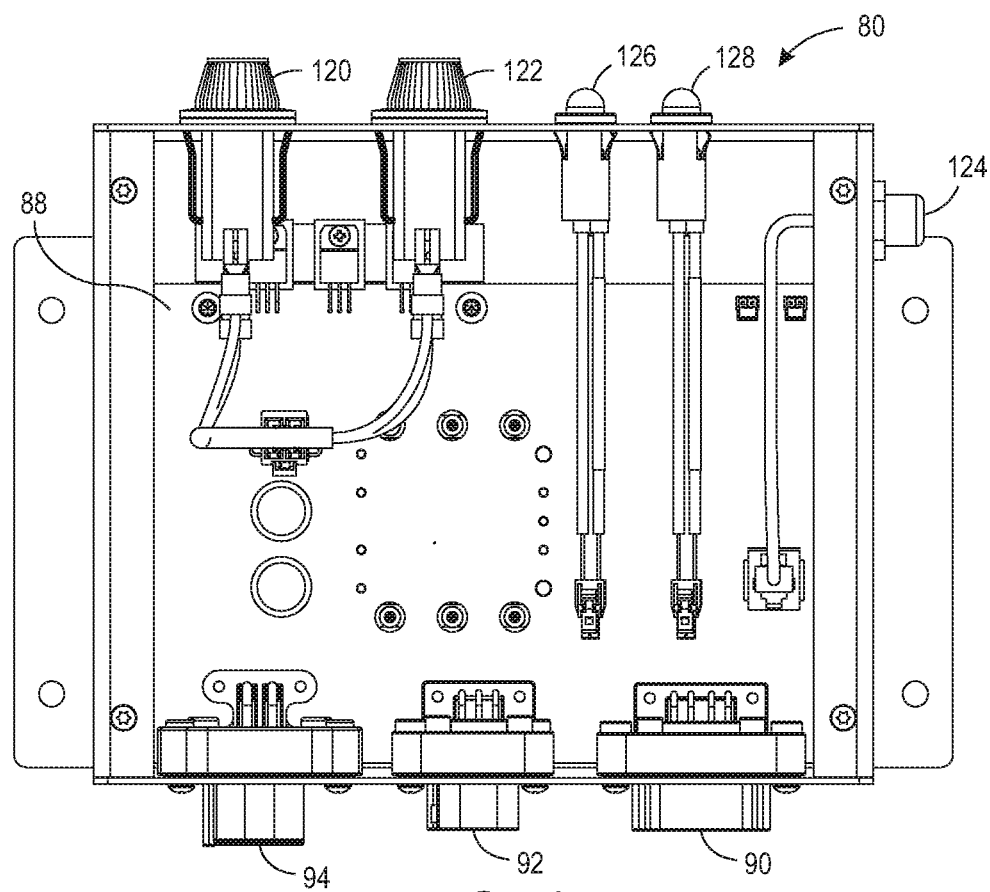
FIG. 6D is a cross-sectional view of the control panel taken generally along line 6D-6D in FIG. 6B.

FIG. 6A is a rear perspective view of control panel 80. FIG. 6B is a bottom elevational view of control panel 80. FIG. 6C is a cross-sectional view of control panel 80 taken generally along line 6C-6C in FIG. 6B. FIG. 6D is a cross-sectional view of control panel 80 taken generally along line 6D-6D in FIG. 6B. The following description should be read in view of FIGS. 6A-6B.

Control panel 80 generally comprises housing 81, port 90, port 92, port 94, and circuit board 88. Housing 81 is secured to frame 14 via bracket 84 (shown in FIG. 3). Housing 81 may comprise fins 86, which act as a heat sink for control panel 80. Ports 90, 92, and 94 are connected to circuit board 88 and are arranged to connect various components of fuel dehydrator together, as well as to connect control panel 80 to a power source via junction box 140, as will be discussed in greater detail below. Control panel 80 further comprises fuse holder 120, fuse holder 122, sealing cap 124, LED 126, and LED 128. Fuse holder 120 comprises a replaceable fuel pump fuse (e.g., Littlefuse # 0FLM020.T). Fuse holder 122 comprises a replaceable 24 Volt power supply fuse (e.g., Littlefuse # KLKD008.T). Sealing cap 124 is a protective cap for a programming connector port. The programming connector port may be, for example, an Ethernet port, and is arranged to allow circuit board 88 to be programmed (i.e., update the software). LED 126 and LED 124 are connected to circuit board 88. During operation, LEDs 126 and 128 indicate the state of fuel dehydrator 10. In an example embodiment LED 126 is green and LED 128 is red. When LED 126 (green) is on, fuel dehydrator 10 is operating normally. When LED 126 (green) is blinking, fuel dehydrator 10 is armed. When LED 128 (red) is on, there is water in the fuel or low fuel pressure (i.e., a signal was received from WIF sensor 68). In this situation, control panel will trigger automatic water drain valve 74 to open within 3 seconds of LED 128 (red) illuminating. When LED 128 (red) is blinking there is an error. The number of flashes indicates the error code. Specifically, the error is indicated by a series of fast flashes, followed by slower flashes. The slower flashes should be counted to get the error code. For example: one flash indicates an error in the fuel pump fuse; two flashes indicates an error in the 24 Volt power supply fuse; three flashes indicates low fuel pressure; four flashes indicates an error in temperature sensor 78; five flashes indicates an error in heating element 70; six flashes indicates an error in automatic water drain valve 74; seven flashes indicates an error in WIF sensor 68; and eight flashes indicates an error in pressure switch 50.

Figure 7:
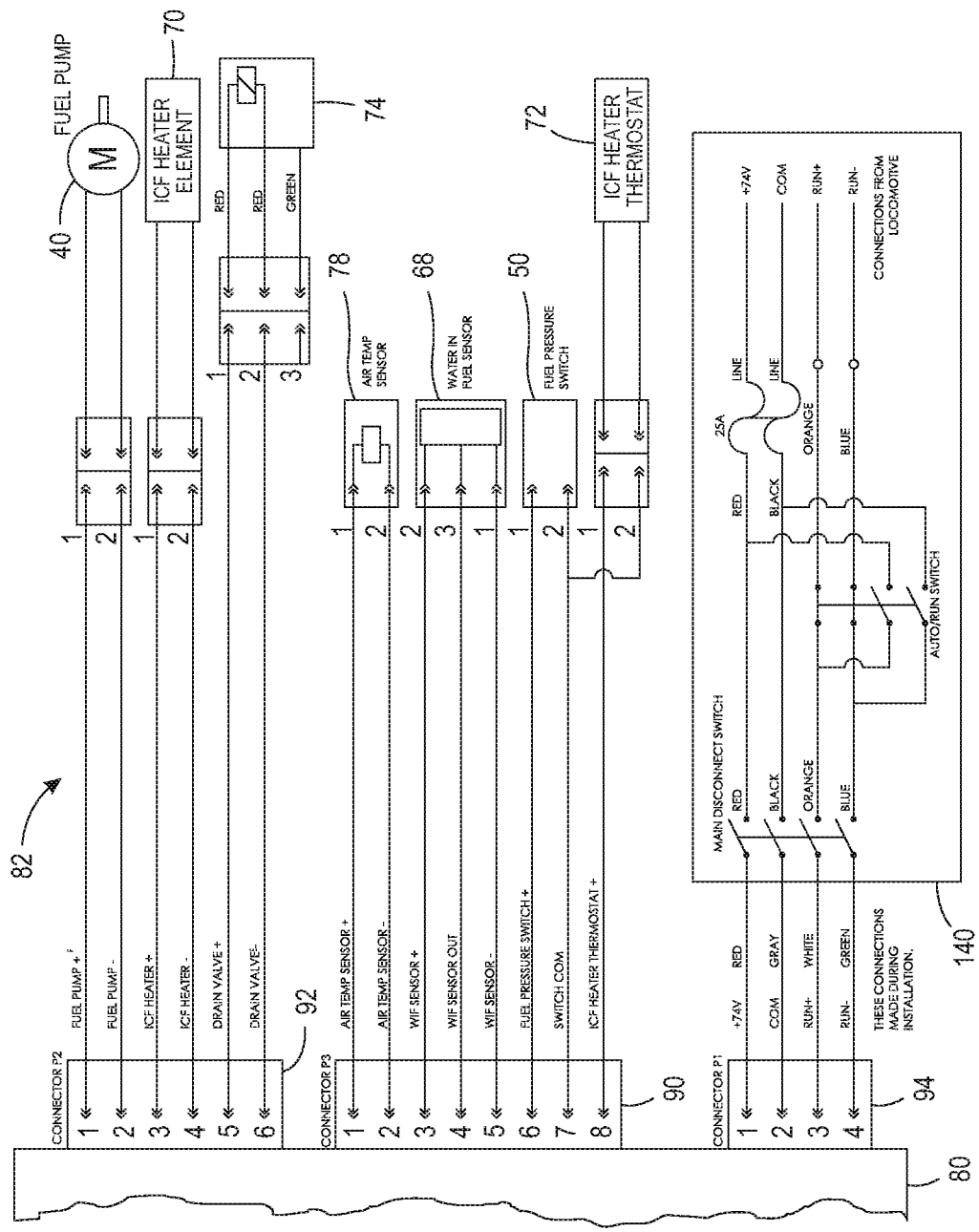
FIG. 7 is a schematic view of an electrical conduit of the fuel dehydrator shown in FIG. 1.

FIG. 7 is a schematic view of electrical conduit 82 of fuel dehydrator 10. As shown and previously discussed, control panel 80 comprises port 90, port 92, and port 94. Port 92 comprises, for example, six pins. Electrical conduit 82 connects fuel pump 40, heating element 70, and automatic water drain valve 74 with circuit board 88 via port 92. Port 90 comprises, for example, eight pins. Electrical conduit 82 connects temperature sensor 78, WIF sensor 68, pressure switch 50, and temperature switch 72 to circuit board 88 via port 90. Port 94 comprises, for example, four pins. Junction box 140 is electrically connected to circuit board 88 via port 94.

Figure 8A:
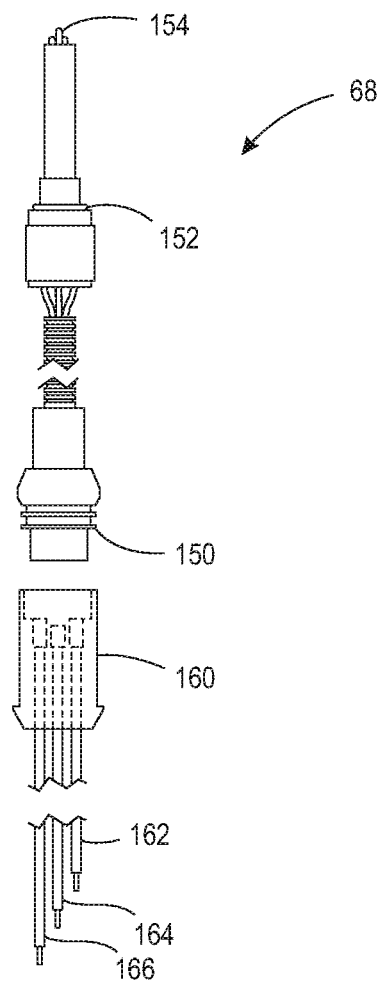
FIG. 8A is an elevational view of a water in fuel sensor of the fuel dehydrator shown in FIG. 1.
Figure 8B:
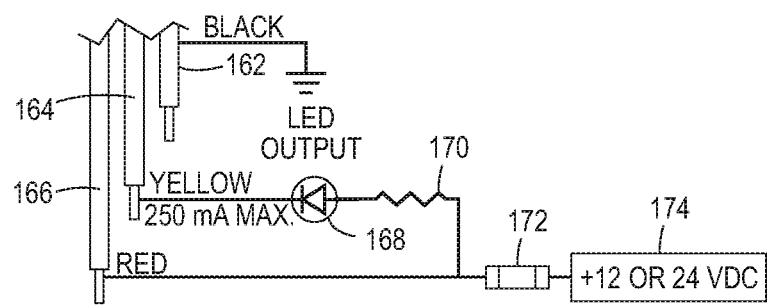
FIG. 8B is a partial schematic view of the water in fuel sensor shown in FIG. 8A.

FIG. 8A is an elevational view of WIF sensor 68 of fuel dehydrator 10. FIG. 8B is a partial schematic view of WIF sensor 68. As shown, WIF sensor 68 comprises male connector 150 and female connector 160. Male connector 150 extends into water reservoir 66 and comprises O-ring seal 152, which fluidly seals male connector 150 within water reservoir 66, and probe tips 154. Male connector 150 is electrically connected to female connector 160. Female connector comprises ground wire 162 (black), switch wire 164 (yellow), and power wire 166 (red). Ground wire 162 grounds WIF sensor. Switch wire 164 connects to one end of LED output 168 (i.e., LEDs 126 and 128). Power wire 166 connects to the other end of LED output 168 and to power source 174 through fuse 172. In an example embodiment, resistor 170 is arranged between LED output 168 and power wire 166. In an example embodiment, power source 174 is a +12 or 24 Volt DC power source. In an example embodiment, fuse 172 is a 1 amp fuse. WIF sensor 68 will detect the presence or absence of water in water reservoir 66. When the water level reaches the two probe tips 154, it completes the circuit which changes the condition of the transistor output and actuate relays, indicator LED lights, programmable logic controllers (PLCs), or microprocessors. Then water reservoir 66 can be drained manually or automatically via automatic water drain valve 74 using relays, PLCs, or microprocessors.

To wire WIF sensor to control panel 80, the wiring diagram of FIG. 8B should be used, and the following instructions should be followed. Connect female connector 160 to male connector 150 and test WIF sensor 68 by shorting together the two probe tips 154 using conductor material. Verify that LED 126 and/or LED 128 is turned on. Disconnect male connector 150 from female connector 160 and lubricate threads before assembly. Tighten WIF sensor 68 with water separator 60 at approximately 195 lbf·in (or 22 N·m). Teflon® brand tape may be used, but is not necessary. Be sure to place WIF sensor 68 in a safe location to avoid damaging it. If using a WIF sensor without a remote indicator light, a 10 second delay needs to be added after water is detected, and after that 10 seconds, automatic water drain valve 74 should be set to open for 3.5 seconds. Automatic water drain valve 66 may comprise a ball valve. When using automatic water drain mode, the wedge handle of the ball valve needs to be set to 60-65% open to reduce swirling of water inside water reservoir 66. Fully opening the ball valve (no restriction) will create swirling of water/diesel emulation due to discharging at a very high flow rate. The restriction ball valve can also be replaced with any orifice regulating valve. Install automatic water drain valve 74 as close as possible to water reservoir 66 to reduce fuel accumulation within fittings therebetween.

Figure 9A:
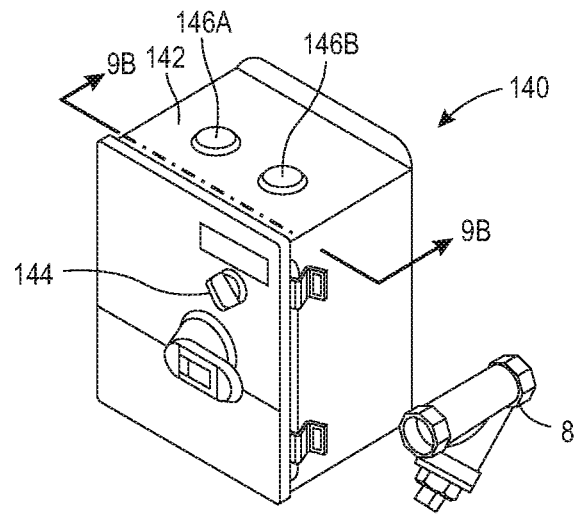
FIG. 9A is a perspective view of a junction box shown in FIG. 7.
Figure 9B:
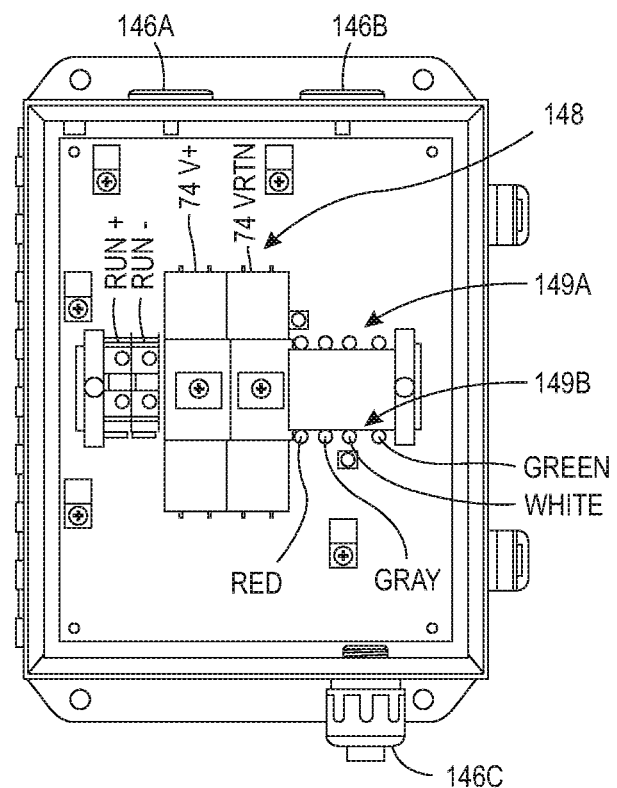
FIG. 9B is a cross-sectional view of the junction box taken generally along line 9A-9A in FIG. 9A.

FIG. 9A is a perspective view of junction box 140 shown in FIG. 7. FIG. 9A also shows optional strainer/mesh 8, which can be connected to input 42 of fuel pump 40 to further filter the fuel prior to entering fuel dehydrator 10. FIG. 9B is a cross-sectional view of junction box 140 taken generally along line 9A-9A in FIG. 9A. Junction box 140 generally comprises housing 142, auto/run switch 144, and ports 146A-C. Junction box 140 is arranged to make electrical connections between fuel dehydrator and the vehicle (e.g., the locomotive) via in terminals 149A. In an example embodiment, a four conductor cable runs between junction box 140, specifically out terminals 149B, and fuel dehydrator 10. As shown in FIG. 9B, terminals red, gray, white, and green correspond to port 94 pins 1, 2, 3, and 4, respectively, and are directly connected thereto. Ports 146A-C allow electrical wiring to enter junction box 140 and be secured to switches 148 and/or terminals 149A-B arranged therein. The run signal (indicated by run+ and run−) is intended to allow fuel dehydrator to run/stop whenever the locomotive is running without operator intervention. An input signal (indicated by 74V+ and 74V RTN) that is on whenever the locomotive is running should be used (e.g., locomotive fuel pump relay). When auto/run switch 144 is in the auto position and the run input is properly connected (i.e., at run+ and run−), fuel dehydrator 10 will start and stop with the locomotive. To arm fuel dehydrator 10, the main disconnect should be turned to the on position and auto/run switch 144 should be moved to the auto position. When auto/run switch 144 is in the run position, fuel dehydrator 10 will operate regardless of the state of the locomotive, as long as it has input power. To run fuel dehydrator 10, the main disconnect should be turned to the on position and auto/run switch 144 should be moved to the auto position.

In an example embodiment, Teflon® based thread sealant is used for all national pipe thread (NPT) connections. When installed in rail vehicles, fuel dehydrator 10 should be installed within the engine or radiator cab. If installation on the locomotive deck is required, a suitable enclosure should be provided to protect fuel dehydrator 10. Fuel dehydrator 10 can be mounted using bolts, fasteners, rivets, welding, adhesives, or any other suitable means of connection. Fuel supply 2 should be connected to 1" or larger hose and strainer/mesh 8 should be installed in line with this hose. Fuel supply 2 should be connected to a first end of a fuel tank. Fuel return 4 should be connected to a ¾" or larger hose. This hose should be connected to a second end of the fuel tank, opposite the first end of the fuel tank. Water drain 6 should be connected to a ⅜" or larger hose. This hose should be connected to the locomotive sump and routed such that water will drain completely to prevent the water from freezing in the line during cold weather.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Fuel supply
4 Fuel return
6 Water drain
8 Strainer/mesh
10 Fuel dehydrator
12 Base
14 Frame
16 Bracket
18 Bracket
20 Fuel filter
22 Inlet
24 Outlet
26 Vent valve
40 Fuel pump
42 Inlet
44 Outlet
46 Backpressure check valve
48 Relief valve
50 Pressure switch
60 Water separator
62 Inlet
64 Outlet
66 Water reservoir
68 Water in fuel sensor
70 Heating element
72 Temperature switch
74 Automatic water drain valve
76 Vent hose
78 Temperature sensor
80 Control panel
82 Electrical conduit 84 Bracket
86 Fins
88 Circuit board
90 Port
92 Port
94 Port
100 Bypass valve
120 Fuse holder
122 Fuse holder
124 Sealing cap
126 Light
128 Light
140 Junction box
142 Housing
144 Auto/run switch
146A Port
146B Port
146C Port
148 Switches
149A In terminals
149B Out terminals
150 Male connector
152 O-ring seal
154 Probe tips
160 Female connector
162 Ground wire
164 Switch wire
166 Power wire
168 LED output
170 Resistor
172 Fuse
174 Power source

What is claimed is:

1. A fuel dehydrator, comprising:
a control panel;
a fuel pump electrically connected to the control panel, the fuel pump including:
a first inlet fluidly connected to a fuel supply; and,
a first outlet;
a fuel filter including a second inlet directly fluidly connected to the first outlet and a second outlet;
a coalescing water separator, including:
a third inlet directly fluidly connected to the second outlet;
a third outlet fluidly connected to a fuel return;
a water reservoir including a heating element, the heating element being connected to the control panel; and,
an automatic water drain valve fluidly connected to a water drain and electrically connected to the control panel;
a temperature sensor electrically connected to the control panel and operatively arranged to detect an ambient air temperature;
wherein the control panel is operatively arranged to:
determine, via a temperature switch, that a water temperature of water in the water reservoir is greater than a predetermined water temperature; and,
prevent the heating element from being activated.

2. The fuel dehydrator as recited in claim 1, wherein the water separator further comprises a water in fuel (WIF) sensor, the WIF sensor being electrically connected to the control panel.

3. The fuel dehydrator as recited in claim 2, wherein:
the automatic water drain valve is set to a closed position; and,
when the WIF sensor detects a predetermined level of water, the automatic water drain valve changes to an open position for a predetermined period of time.

4. The fuel dehydrator as recited in claim 3, wherein the control panel comprises:
a first indicator light operatively arranged to indicate when the automatic water drain valve is in the open position; and,
a second indicator light operatively arranged to indicate an error in one of the temperature sensor, the heating element, the automatic water drain valve, and the WIF sensor.

5. The fuel dehydrator as recited in claim 1, wherein the control panel is operatively arranged to:
determine, via the temperature switch, that the water temperature is less than or equal to the predetermined water temperature; and,
allow the heating element to be activated.

6. The fuel dehydrator as recited in claim 5, wherein:
the heating element is set to an off state; and,
when the temperature sensor detects an air temperature below a predetermined air temperature, the heating element changes to an on state.

7. The fuel dehydrator as recited in claim 6, wherein when the temperature switch detects the water temperature above the predetermined water temperature, the heating element changes to the off state.

8. The fuel dehydrator as recited in claim 1, further comprising a bypass valve fluidly connected to the second outlet, wherein:
when the bypass valve is closed, fuel flows from the second outlet to the third inlet; and,
when the bypass valve is open, fuel flows from the second outlet to the fuel return.

9. The fuel dehydrator as recited in claim 1, further comprising a pressure switch electrically connected to the control panel and operatively arranged to detect the fuel pressure in the fuel dehydrator.

10. The fuel dehydrator as recited in claim 9, wherein the control panel further comprises an indicator light operatively arranged to indicate the fuel pressure is below a predetermined pressure.

11. The fuel dehydrator as recited in claim 1, further comprising a relief valve fluidly connected to the first outlet and the third outlet.

12. The fuel dehydrator as recited in claim 1, wherein the control panel comprises a programmable circuit board.

13. The fuel dehydrator as recited in claim 12, wherein the control panel comprises at least one indicator light electrically connected to the programmable circuit board, the indicator light operatively arranged to indicate that the automatic drain valve is in an open state.

14. A fuel dehydrator, comprising:
a control panel including a programmable circuit board and at least one indicator light electrically connected to the programmable circuit board;
a fuel pump electrically connected to the control panel, the fuel pump including:
a first inlet fluidly connected to a fuel supply; and,
a first outlet;
a fuel filter including a second inlet fluidly connected to the first outlet and a second outlet;
a water separator, including:
a third inlet fluidly connected to the second outlet;
a third outlet fluidly connected to a fuel return;
a water reservoir, having including:

a heating element, the heating element electrically connected to the control panel; and,
a water in fuel (WIF) sensor, the WIF sensor electrically connected to the control panel; and, an automatic water drain valve:
fluidly connected to the water reservoir and a water drain; and,
electrically connected to the control panel;
wherein:
the automatic water drain valve is set to a closed position; and,
when a predetermined level of water accumulates in the water reservoir, the WIF sensor sends a signal to the control panel, which changes the automatic water drain valve to an open position for a predetermined period of time and turns on the at least one indicator light to indicate that the automatic drain valve is in an open state.

15. The fuel dehydrator as recited in claim 14, wherein:
the fuel dehydrator further comprises a temperature sensor electrically connected to the control panel; and,
the water reservoir further comprises a temperature switch electrically connected to the control panel.

16. The fuel dehydrator as recited in claim 15, wherein:
the heating element is set to an off state;
when the temperature sensor detects an ambient air temperature below a predetermined air temperature, the control panel turns the heating element to an on state; and,
when the temperature switch detects a water temperature above a predetermined water temperature, the control panel turns the heating element to the off state.

17. The fuel dehydrator as recited in claim 14, further comprising a bypass valve fluidly connected to the second outlet, wherein:
when the bypass valve is closed, fuel flows from the second outlet to the third inlet; and,
when the bypass valve is open, fuel flows from the second outlet to the fuel return.

18. The fuel dehydrator as recited in claim 14, further comprising a pressure switch electrically connected to the control panel, wherein when the pressure switch detects a fuel pressure below a predetermined pressure for a predetermined period of time, the control panel disables the fuel pump.

19. A fuel dehydrator, comprising:
a control panel including a first indicator and a second indicator;
a fuel pump electrically connected to the control panel, the fuel pump including:
a first inlet fluidly connected to a fuel supply; and,
a first outlet;
a fuel filter including a second inlet fluidly connected to the first outlet and a second outlet;
a water separator, including:
a third inlet fluidly connected to the second outlet;
a third outlet fluidly connected to a fuel return;
a water reservoir having a heating element, the heating element electrically connected to the control panel;
an automatic water drain valve:
fluidly connected to the water reservoir and a water drain; and,
electrically connected to the control panel, wherein when the automatic water drain valve is set to an open state the control panel activates the first indicator;
a pressure switch electrically connected to the control panel, wherein when the pressure switch detects a fuel pressure below a predetermined pressure for a predetermined period of time, the control panel:
disables the fuel pump; and,
activates the second indicator; and,
a temperature sensor electrically connected to the control panel;
wherein:
the heating element is set to an off state; and,
when the temperature sensor detects an air temperature below a predetermined air temperature, the heating element changes to an on state.

* * * * *